United States Patent
Lindenau et al.

(10) Patent No.: US 7,857,903 B2
(45) Date of Patent: Dec. 28, 2010

(54) MIXTURE FOR PRODUCING SINTERED MOLDINGS COMPRISING CARNAUBA WAX

(75) Inventors: Rene Lindenau, Radevormwald (DE); Diego Fax, Radevormwald (DE); Lars Wimbert, Schwelm (DE)

(73) Assignee: GKN Sinter Metals Holding GmbH, Radevormwald (DE)

( * ) Notice: Subject to any disclaimer, the term of this patent is extended or adjusted under 35 U.S.C. 154(b) by 102 days.

(21) Appl. No.: 12/399,294

(22) Filed: Mar. 6, 2009

(65) Prior Publication Data
US 2009/0217843 A1 Sep. 3, 2009

Related U.S. Application Data

(63) Continuation of application No. PCT/EP2007/007559, filed on Aug. 29, 2007.

(30) Foreign Application Priority Data

Sep. 7, 2006 (DE) ............... 10 2006 041 944

(51) Int. Cl.
*C08L 91/06* (2006.01)
*C04B 35/632* (2006.01)
*B22F 3/00* (2006.01)
*B22F 3/12* (2006.01)

(52) U.S. Cl. ............ 106/270; 108/272; 108/316; 264/669; 75/230; 75/252

(58) Field of Classification Search ........... 106/270, 106/271, 316; 75/230, 252; 264/669
See application file for complete search history.

(56) References Cited

U.S. PATENT DOCUMENTS

| 5,374,362 A | * | 12/1994 | McFarland | 106/2 |
| 5,597,856 A | * | 1/1997 | Yu et al. | 524/227 |
| 6,051,184 A | * | 4/2000 | Kankawa | 419/36 |

FOREIGN PATENT DOCUMENTS

| DE | 102 03 283 A1 | 8/2003 |
| EP | 0 436 952 A | 7/1991 |
| EP | 0 561 343 A | 9/1993 |

* cited by examiner

*Primary Examiner*—David M Brunsman
(74) *Attorney, Agent, or Firm*—Woodcock Washburn LLP

(57) ABSTRACT

To achieve the object of providing a mixture for producing sinterable mouldings that allows high pressed densities to be obtained in a green compact, a mixture is proposed which comprises at least one metallic material and/or plastics material and at least one pressing aid, the pressing aid comprising about 0.5% to about 60% by weight, based on the total amount of the pressing aid, of at least one amide, and about 40% to about 99.5% by weight, based on the total amount of the pressing aid, of at least one carnauba wax.

18 Claims, 3 Drawing Sheets

MIXTURE FOR PRODUCING SINTERED MOLDINGS COMPRISING CARNAUBA WAX

CROSS REFERENCE TO RELATED APPLICATION

This application is a continuation of International Application No. PCT/EP2007/007559 filed Aug. 29, 2007, which claims the benefit of German Patent Application No. 10 2006 041 944.8 filed Sep. 7, 2006, the entireties of which are incorporated herein by reference.

FIELD OF THE INVENTION

The present invention relates to a mixture for producing sintered moldings comprising at least one metallic material and/or plastic material and at least one pressing aid, as well as a method for producing such a mixture, its use, a corresponding pressing aid, and also a green compact produced from the mixture according to the invention.

BACKGROUND

Sintered moldings are used in many applications, in particular, in automobile construction and there especially as moldings in the engine and also in the transmission. One difficulty in the production of sintered moldings consists in, among other things, producing these with the highest possible density. A molding pressed in one or more steps by a typical powder metallurgical method from a sinterable powder, generally designated as a green compact, is here sintered in a second step under a protective atmosphere, so that a solid and also dimensionally accurate molding is produced.

The density of sintered moldings obtained in such a way depends essentially on the density of the green compact achieved in the first pressing step, the so-called green density (also called pressing density). Therefore it is worth the effort to have green compacts that already feature the highest possible density after just the first pressing step.

The high molding pressures typically used in the state of the art for producing green compacts with a high density, however, result, on one hand, in high wear of the compression molding die itself and also lead, on the other hand, to increased ejection sliding friction of the completed green compact in the extrusion die. In this way, higher ejection forces with correspondingly increased wear are to be applied to the compression molding die. In addition, high ejection forces raise the risk of undesired local redensification and crack formation in the green compact.

From DE 102 44 486 A1, a pressing aid is known that comprises 20 to 60 wt. % of a polyglycol with respect to the total amount of pressing aid and 40 to 75 wt. % of a montan wax with respect to the total amount of pressing aid. In this way it is possible, at pressures of 800 MPa, to produce green compacts that have a pressing density of at least 7.14 g/cm3.

The task of the present invention is to make available a mixture for producing sintered moldings by means of which the previously mentioned disadvantages are avoided.

SUMMARY

This task is achieved by a mixture for producing sintered moldings comprising at least one metallic material and/or plastic material and at least one pressing aid, wherein the pressing aid comprises approximately 0.5 wt. % to approximately 60 wt. % of at least one amide with respect to the total amount of the pressing aid and approximately 40 wt. % to approximately 99.5 wt. % of at least one carnauba wax with respect to the total amount of the pressing aid.

In the sense of the present invention, sinterable moldings are understood to be moldings that were produced completely from a sinterable material. On the other hand, these are also understood as composite parts, wherein the basic body of such a composite part can be produced from an aluminum-containing or iron-containing mixture and the body further connected to the basic body can be produced from another material, for example, cast steel, sintered or solid, or from solid cast aluminum. Conversely, the composite part can also have, for example, only on the front sides or its surface, a sintered layer made from, for example, an aluminum-containing or ceramic-containing mixture, while the basic body is produced, for example, from steel or cast iron, sintered or solid. The sintered moldings can be calibrated and/or hardened using heat.

Metallic materials and/or plastic materials in the sense of the present invention are, in particular, powder or mixtures made from metallic, ceramic, and/or plastic components, for example, from low-alloy steels, chromium-nickel steels, bronzes, nickel-based alloys, such as Hastalloy, Inconel, metal oxides, metal nitrides, metal silicides, or the like, furthermore, aluminum-containing powders or mixtures, wherein the mixtures can also contain high melting-point components, such as, for example, platinum or the like. The powder that is used and its particle size are each dependent on the corresponding purpose of use, wherein the selection is known to the responsible person skilled in the art. Preferred iron-containing powders are the alloys 316L, 304L, Inconel 600, Inconel 625, Monel, Hastalloy B, X, and C, and also Distaloy DH1. Here, obviously mixtures of the previously mentioned iron-containing powders can also be used. Furthermore, the metallic material and/or plastic material can be completely or partially made from plastic fibers or fibers, advantageously fibers with diameters between approximately 0.1 to approximately 2 µm and a length of a few µm up to approximately 50 mm.

In addition, carbon can also be added in a corresponding amount to the metallic material and/or plastic material for forming desired alloys.

In the sense of the present invention, carnauba waxes are plant waxes that typically have a density in a range from 0.990 to 0.999 g/cm3 and a melting point, in particular, in a range of approximately 83 to approximately 86° C. Carnauba waxes are obtained, in particular, from leaves of the Brazilian fan palm *Copernicia prunifera* (carnauba palm). Example carnauba waxes contain approximately 85 wt. % ester of wax acids, ω-hydroxycarboxylic acids or cinnamic acids with wax alcohols and diols. In addition, carnauba waxes also contain, approximately 3 to approximately 5 wt. % free wax acids, in particular, carnauba and cerotic acids, in addition, alcohols and diols, hydrocarbons and mineral compounds. Mixtures of different carnauba waxes can also be used.

Here, the carnauba wax in the sense of the present invention preferably has an iodine number in a range from approximately 8.5 to approximately 10.5, in addition, the acid number of the carnauba wax in the sense of the present invention preferably lies in a range from approximately 1 to approximately 4, and also the saponification number lies in a range from approximately 70 to approximately 83.

Amides in the sense of the present invention are selected, in particular, from a group comprising primary, secondary, and/or tertiary amides. In a further preferred way, the amides in the sense of the present invention have at least one alkyl radical with 4 to 22 carbon atoms, preferably 5 to 21 carbon atoms. In an especially preferred way, the amide is a primary amide with an alkyl radical with 5 to 21 carbon atoms. In the sense of the present invention, mixtures of different amides can also be added to the pressing aid, wherein the mixtures advantageously contain only primary amines. In the mixtures, in particular, the chain length of the alkyl radical can vary in a range from 4 to 22, preferably 5 to 21 carbon atoms.

As far as ranges or number values are specified in the present invention, through the addition of the word "approximately" it is clarified that the upper and lower range limits do not involve absolute values. Instead, it is clear to the responsible person skilled in the art that the success of the present invention can still be achieved even for deviations from the upper or lower limits defined in terms of numbers. Here, the range of deviation can differ by up to 5% from the specified upper and lower limits.

The mixture according to the invention has the great advantage that through the addition of the defined pressing aid, very high pressing densities can be obtained that are not achieved, in particular, just through the use of the components of carnauba wax and amide, and that also surpass those pressing aids known from the state of the art. In this way, a higher green strength results for the green compact produced from the mixture according to the invention. In addition, it has been shown that with the mixture according to the invention, hot or cold pressing can be performed continuously for producing green compacts in a temperature range starting from room temperature (20° C.) up to approximately 150° C. This method allows a very wide range of use for the mixture according to the invention and the pressing aid according to the invention that far exceeds that of known pressing aids, in particular, also of those disclosed in DE 102 44 486 A1.

In addition, the mixture according to the invention has the advantage that after the pressing of the green compact, considerably smaller ejection pressures are needed for the removal of the green compact from the compression molding die. Here, the ejection pressures lie underneath approximately 170 MPa for a temperature of 65° C. and a molding pressure of 700 MPa. In addition, for the production of moldings from the mixture according to the invention, considerably higher pressures can be exerted by the rams of the compression molding die that is used than for other pressing aids known from the state of the art. Thus, the pressures that can be used in the lower ram for a one-sided compaction, i.e., the pressure of the mixture according to the invention in a compression molding die with a lower ram, lie in a range above 400 MPa.

Through these advantageous properties of the mixture according to the invention, on one hand the wear of the compression molding dies that are used is considerably reduced and, on the other hand, the risk of crack formations or else local redensification of the produced green compact is reduced. In addition, the pressing densities that can be achieved with the mixture according to the invention lie in the vicinity of those of the finished and sintered molding.

The mixture according to the invention can also contain other components, in particular, lubricant, preferably in a quantity of approximately 0.2 to approximately 5 wt. % with respect to the total amount of the mixture. As the lubricant, here, on one hand, self-lubricating means can be provided, such as, for example, $MoS_2$, $WS_2$, BN, graphite, and/or other carbon modifications, such as coke, polarized graphite, or the like. Advantageously, here, approximately 1 wt. % to approximately 3 wt. % of the lubricant is added to the sinterable mixture. Through the use of the previously mentioned lubricant, the moldings produced from the sinterable mixture can be given, above all, self-lubricating properties.

In addition, the mixture according to the invention can furthermore contain carbon, preferably in a quantity in a range from at least 0.3 wt. %, further preferred approximately 0.4 wt. % to approximately 1.4 wt. %, a maximum approximately 3 wt. % with respect to the total amount of the mixture for forming different alloys.

The mixture according to the invention can furthermore also include other pressing aids or aerosols, but other additives known to someone skilled in the art are also possible, selected according to the purpose of the application. They can be produced by mixing the individual components with typical apparatuses, such as asymmetrically moved mixers both heated (hot mixing) and also at room temperature (cold mixing), wherein hot mixing is preferred, preferably at temperatures in a range from approximately 50 to approximately 80° C.

Especially preferred are mixtures according to the invention that have approximately 50 wt. % to approximately 75 wt. % of at least one carnauba wax and approximately 25 wt. % to approximately 50 wt. % of at least one amide. In addition, advantageously also at least one other pressing aid, selected from the group of fatty acid salts, in particular, the stearates, further preferred Zn stearate and/or Si stearate can be included. Examples here are the pressing aid Kenolube P11, Höganäs AB, Sweden, which represents a mixture of a Zn stearate and an amide, or Caplube L of the producer H.L. Blachford Ltd., Missisanga, Canada. At least one additional pressing aid can be included in this mixture in a quantity of up to approximately 25 wt. % with respect to the total amount of the pressing aid. In addition, the mixtures according to the invention preferably contain no other pressing aids, in particular, those on a different chemical basis, which, however, is not explicitly ruled out. In a further preferred way, the mixture according to the invention has, as a pressing aid, approximately 0.3 wt. % to approximately 0.9 wt. % with respect to the total amount of the mixture, a mixture from approximately 25 to approximately 50 wt. % of an amide, and approximately 50 to approximately 75 wt. % of at least one carnauba wax, and also optionally approximately 0 to 25 wt. % of a Zn stearate, each with respect to the total amount of the pressing aid, and approximately 0.4 to approximately 0.8 wt. % carbon and 0.005 to approximately 0.04 wt. % of an aerosol, both with respect to the total amount of the mixture, wherein the remainder is formed in an especially preferred way from a metallic material, wherein the metallic material can also be a mixture of different metallic materials.

The present invention furthermore relates to a method for producing the mixture according to the invention, wherein in a first step, at least one amide and at least one carnauba wax included by the pressing aid are melted together and in a second step, the pressing aid produced according to the first step is added to the metallic material and/or plastic material.

In a further preferred way it is provided that after the first step of the method according to the invention, the resulting and cooled melt is milled or atomized. Surprisingly, it has been shown that for the method according to the invention, in the green compacts produced with the mixture according to the invention, pressing densities are obtained, whether through uniaxial, biaxial, or isostatic pressing, that lie significantly above those that can be typically achieved with the pressing aids known from the state of the art.

Alternatively, a method for producing the mixture according to the invention is provided according to which in a first step, at least one amide and at least one carnauba wax included by the pressing aid are mixed together and in a second step the pressing aid produced according to the first step is added to the metallic material and/or plastic material.

Also by means of this alternative method, after the metallurgical pressing process, green compacts can be achieved with high pressing densities and correspondingly also high green strengths, wherein preferably the at least one amide and the at least one carnauba wax are used in powder form, in particular, with a grain size of less than approximately 500 µm.

In addition, the present invention relates to the use of the mixture according to the invention for producing sintered moldings and also to a pressing aid as defined in Claims 1 to 6 of the present invention. In an especially preferred way, the pressing aid has approximately 50 to approximately 75 wt. % of at least one carnauba wax and approximately 25 to 50 wt. % of an amide, preferably of a primary amide with an alkyl radical with 5 to 21 carbon atoms or mixtures of such amides.

Finally, the present invention relates to green compacts produced from the mixture according to the invention with a pressing density according to ISO 3927-1985 at 700 MPa and 65° C. of at least 7.15 g/cm3.

These and other advantages of the present invention will be described in greater detail with reference to the following examples.

Mixtures a) to d) were produced from the sinterable metal powder distaloy DH1 by the company Höganäs AB, Sweden with 0.6 wt. % carbon, 0.02 wt. % of the aerosol Aerosil®200C Degussa AG, Düsseldorf, Germany, and also 0.6 wt. % of the following pressing aid each with respect to the total amount of the mixture.

Mixture a) Kenolube P11, Höganäs AB, Sweden, which represents a mixture made from 22.5 wt. % zinc stearate and 77.5 wt. % of an amide wax, Mixture b) pure carnauba wax with the product designation carnauba wax flakes F (technical application), Benecke GmbH, Hamburg, Germany;

Mixture c) a fatty acid amide wax with a melting point of 115° C. with the product designation LUBA-print wax 467/E of the manufacturer L.B. Bader & Co. GmbH, Rottweil, Germany, and Mixture d) a mixture made from 60 wt. % of the carnauba wax according to item b) and 40 wt. % of the fatty acid amide according to c), wherein this mixture was produced through the common melting of the carnauba wax and the amide wax, solidification of the melt with optionally subsequent cooling, and then conversion or fractionation of this product into a powder.

Preferably, the portion of the added pressing aid in the mixture according to the invention lies in a range from approximately 0.1 to approximately 5 wt. %, preferably approximately 0.1 to approximately 3 wt. %, even further preferred approximately 0.1 to approximately 1.5 wt. % with respect to the total amount of the mixture according to the invention.

The previously mentioned mixtures were filled into a typical compression molding die and pressed uniaxially at a pressure of 700 MPa and a temperature of 65° C. into cylinders with a diameter of 14.3 mm and a length of 14 mm.

In this way, for the previously mentioned four mixtures, the flow times were determined in compliance with DIN ISO 3923 (determination of the filling density part 1: funnel method), the compressibility according to DIN ISO 3927 (determination of the compressibility for uniaxial compression), here, however with an M/Q ratio (lateral surface to cross section ratio) of ca. 12 in the test pieces to be pressed instead of a value of M/Q of ca. 4 according to the standard, and also the green or pressing density of the produced green compact in compliance with DIN ISO 3369 (impermeable sintered metals and hard metals/determination of density). In addition, friction measurements were performed in a one-way working press at a temperature of 65° C. with a lower ram, wherein the die forces can be detected and from these the values for the lower-ram pressure and the ejection pressure can be determined. The M/Q ratio equaled ca. 12 and a molding pressure of 700 MPa was used. The results of the previously mentioned measurements are shown in the following figures:

DETAILED DESCRIPTION OF ILLUSTRATIVE EMBODIMENTS

Figure 1:
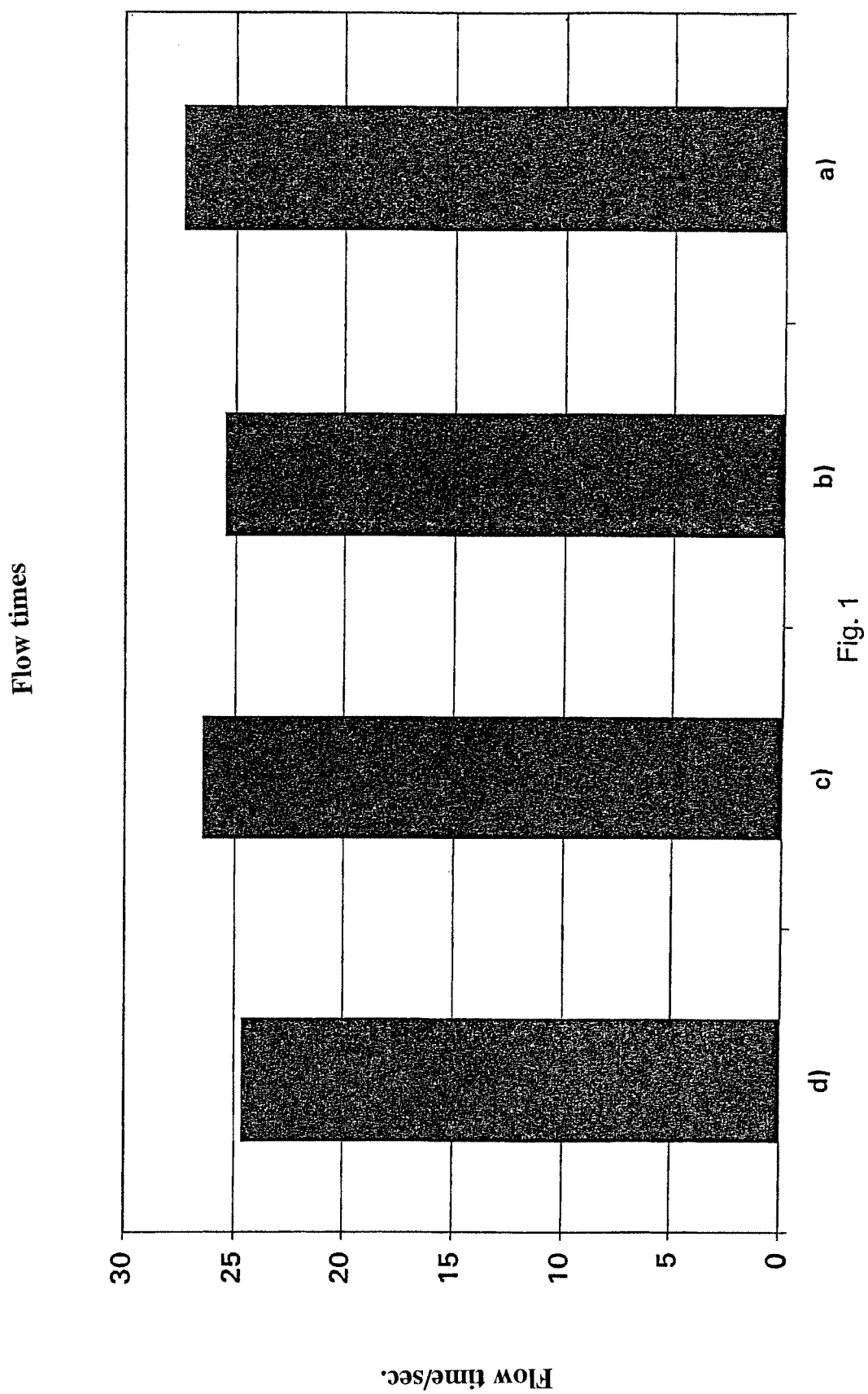
FIG. 1: flow times of the mixtures a)-d)

It is to be taken from FIG. 1 that the flow times of different mixtures a)-d) lie in a relatively similar range.

Figure 2:
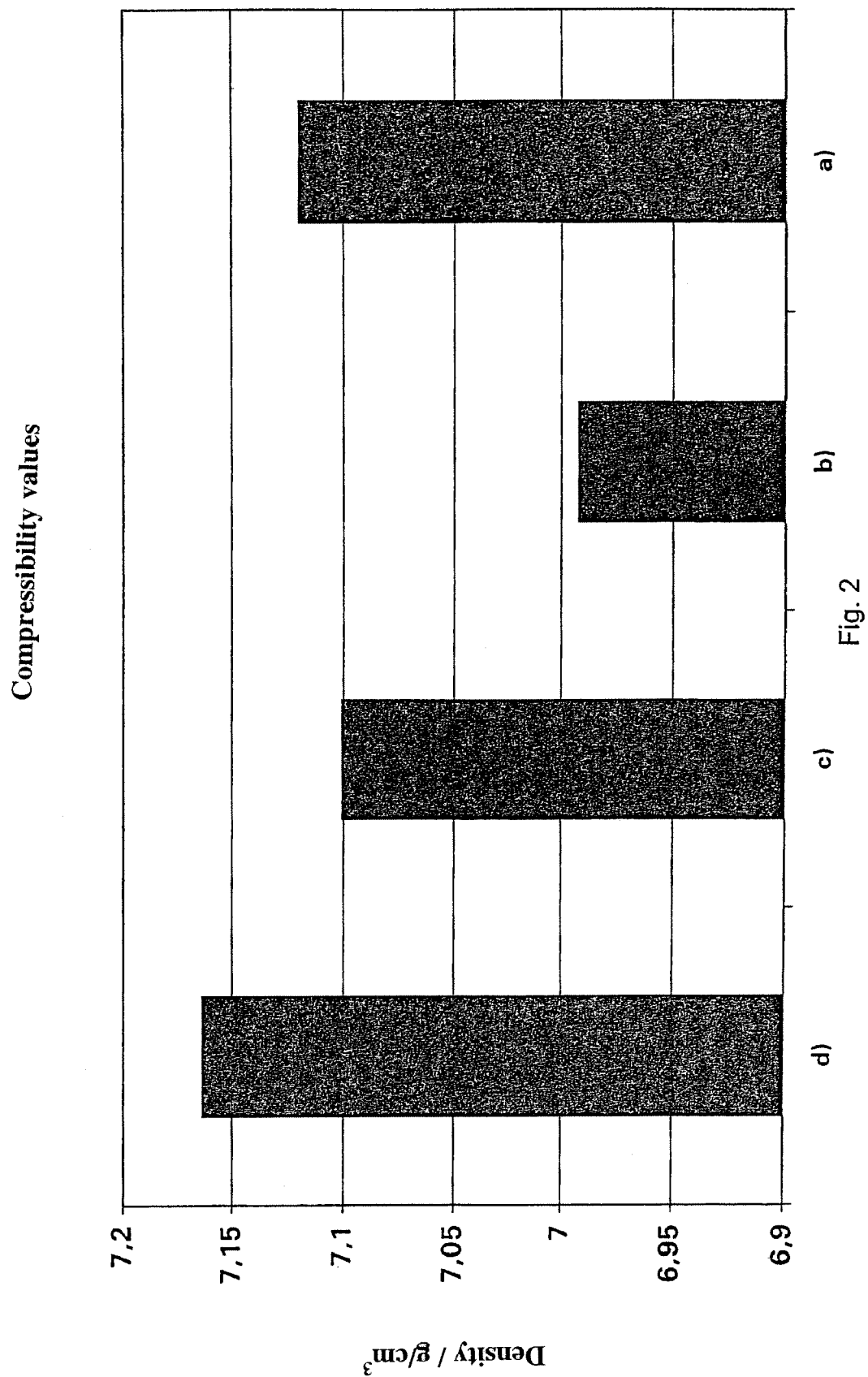
FIG. 2: achievable pressing densities with the mixtures according to a)-d)

FIG. 2 shows that the pressing density achievable with the mixture d) according to the invention lies considerably above that of mixture a) and, in particular, also significantly above that of mixture b) and also mixture c) that have individual components of the pressing aid according to mixture d). Here, a surprising synergistic effect is shown that can be obtained through a mixture of the pressing aid according to the mixtures b) and c).

Figure 3:
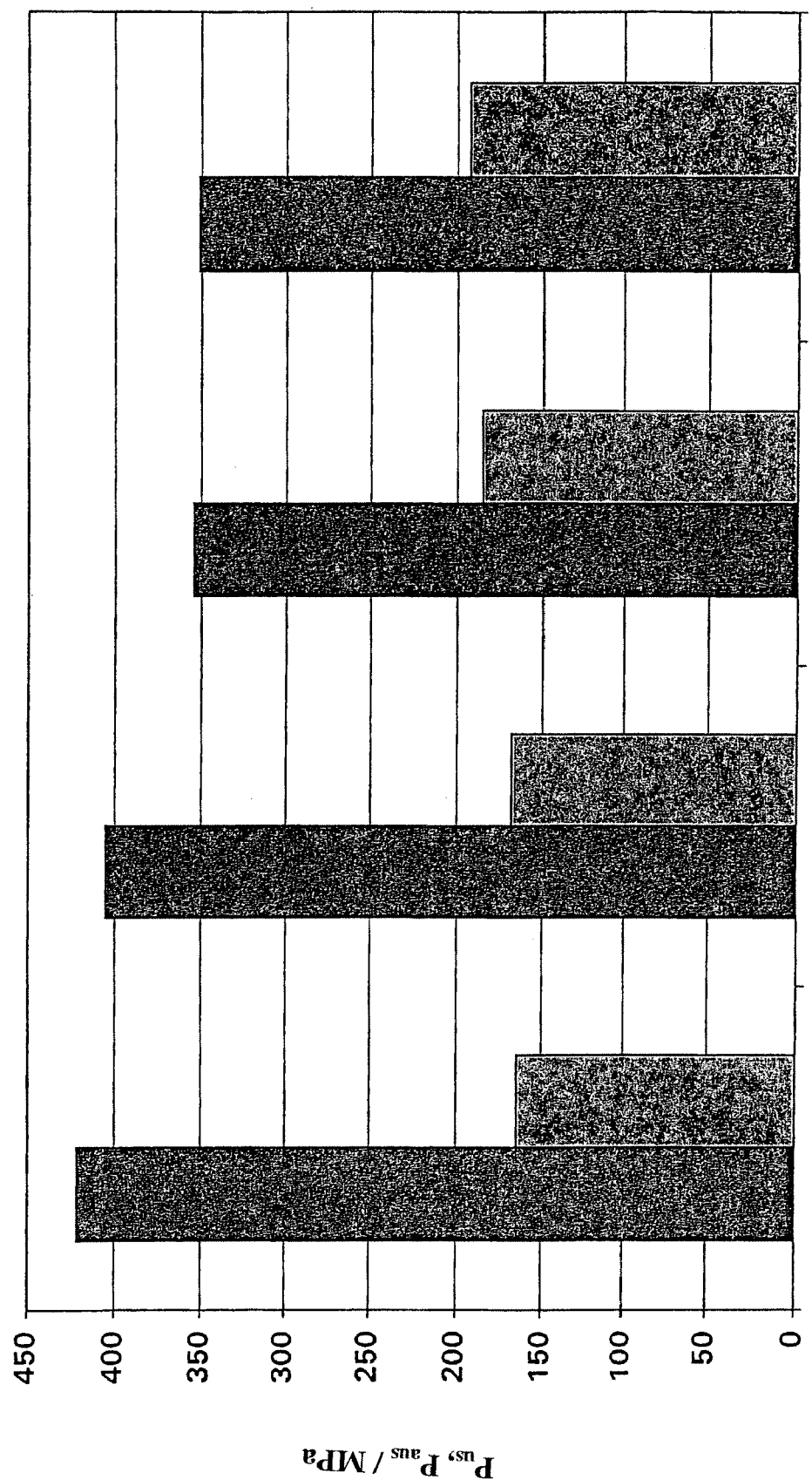
FIG. 3: results of the friction measurements with determined lower-ram pressure (black) and ejection pressure (light) of the mixtures a)-d).

The friction measurements shown in FIG. 3 show that, for the mixture d) according to the invention, advantageously the lower-ram pressure pus lies significantly above that of the other mixtures according to a) to c), on the other hand, the ejection pressure paus is lower than for the other mixtures a) to c). Thus, using the mixture d) according to the invention in the compression step, a higher pressure is also effectively produced in the compression molding die, on the other hand, the ejection sliding friction is lowered with the mixture d) according to the invention, which is shown in the lower ejection pressure paus of the green compact produced by means of the mixture d) in comparison to the mixtures a) to c).

Through the present invention, thus a mixture is made available that lowers the widespread disadvantages of known mixtures in a single mixture, namely, on one hand, it is possible with the mixture according to the invention to achieve high green strengths in the green compacts obtained from these mixtures at high green or pressing densities of the same. On the other hand, the ejection forces out of the compression molding die can be considerably reduced, wherein its service life is increased. The green compacts produced from the mixtures according to the invention have an excellent quality, wherein through the reduced crack formation and the reduction of the formation of local redensification points, a qualitatively equal and high-value production of sintered moldings is guaranteed.

What is claimed is:

1. A mixture for producing sintered moldings, the mixture including at least one of a metallic material or a plastic material and at least one pressing aid, wherein the pressing aid includes approximately 0.5 to approximately 60 wt. % of at least one amide with respect to the total amount of the pressing aid and approximately 40 to approximately 99.5 wt. % of at least one carnauba wax with respect to the total amount of the pressing aid.

2. The mixture as recited in claim 1, wherein the amide is selected from a group including primary, secondary, and tertiary amides.

3. The mixture as recited in claim 1, wherein the amide has at least one alkyl radical with 4 to 22 carbon atoms.

4. The mixture as recited in claim 1, wherein the amide is a primary amide with an alkyl radical with 5 to 21 carbon atoms.

5. The mixture as recited in claim 1, wherein the carnauba wax has an iodine number of approximately 8.5 to approximately 10.5.

6. The mixture as recited in claim 1, wherein the pressing aid is present in this in a quantity in a range from approximately 0.1 wt. % to approximately 5 wt. % with respect to the total amount of the mixture.

7. The mixture as recited in claim 1, configured to produce a green compact having a pressing density of at least 7.15 g/cm3 at 700 MPA and at 65° C.

8. A method for producing a mixture configured to produce sintered moldings, the mixture including at least one of a metallic material or a plastic material and at least one pressing aid, the method comprising the steps of:
 in a first step, combining at least one amide and the at least one carnauba wax to produce a pressing aid that includes approximately 0.5 wt. % to approximately 60 wt. % of the at least one amide with respect to the total amount of the pressing aid, and approximately 40 wt. % to approximately 99.5 wt. % of the at least one carnauba wax with respect to the total amount of the pressing aid;
 in a second step, adding the pressing aid to the at least one of the metallic material or plastic material.

9. The method as recited in claim 8, further comprising the step of:
 after the first step, milling or atomizing the pressing aid.

10. The method as recited in claim 8, further comprising the step of producing a green compact having a pressing density of at least 7.15 g/cm3 at 700 MPA and at 65° C.

11. The method as recited in claim 8, wherein the combining step comprises melting the at least one amide and the at least one carnauba wax together.

12. The method as recited in claim 8, wherein the combining step comprises mixing the at least one amide and the at least one carnauba wax.

13. The method as recited in claim 8, further comprising the step of producing a sintered molding from the mixture.

14. A pressing aid configured to produce sintered moldings, the pressing aid including approximately 0.5 to approximately 60 wt. % of at least one amide with respect to the total amount of the pressing aid and approximately 40 to 99.5 wt. % of at least one carnauba wax with respect to the total amount of the pressing aid.

15. The pressing aid as recited in claim 14, wherein the amide is selected from a group including primary, secondary, and tertiary amides.

16. The pressing aid as recited in claim 14, wherein the amide has at least one alkyl radical with 4 to 22 carbon atoms.

17. The pressing aid as recited in claim 14, wherein the amide is a primary amide with an alkyl radical with 5 to 21 carbon atoms.

18. The pressing aid as recited in claim 14, wherein the carnauba wax has an iodine number of approximately 8.5 to approximately 10.5.

\* \* \* \* \*